J. B. LAMBETH.
NUT LOCK.
APPLICATION FILED SEPT. 1, 1908.
936,331. Patented Oct. 12, 1909.
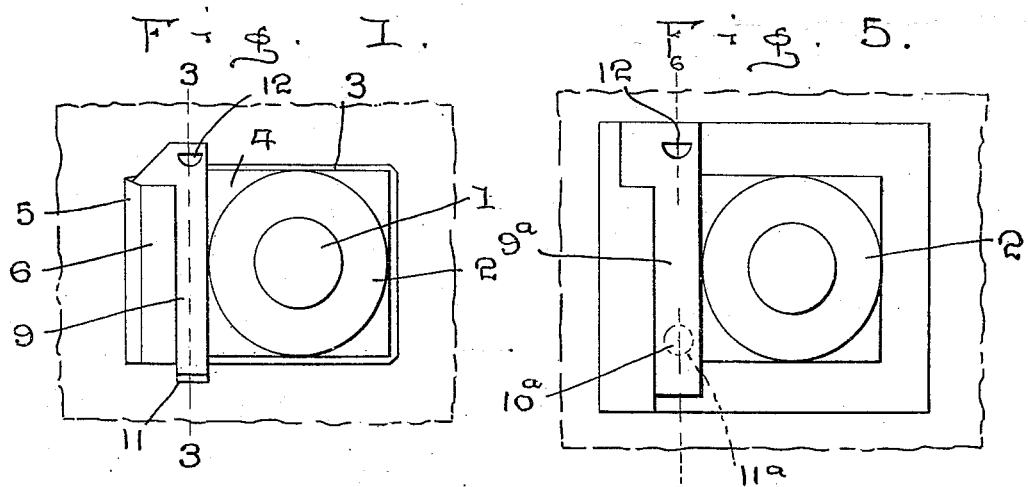
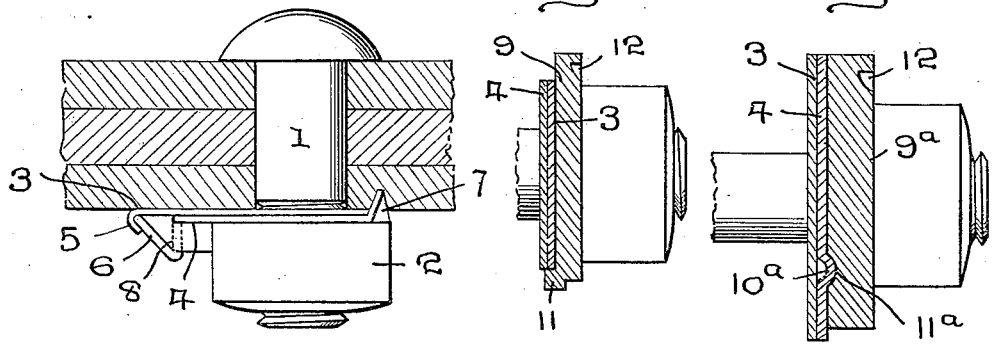
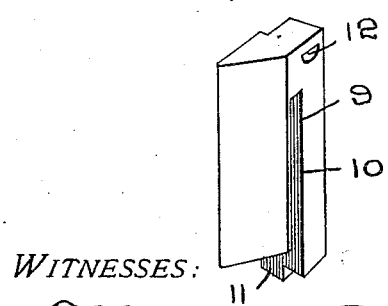
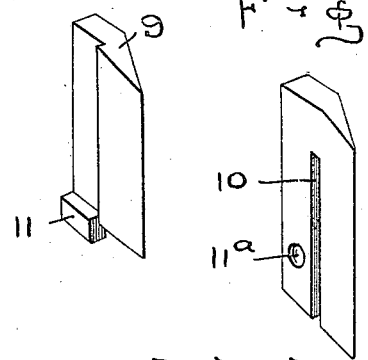
WITNESSES:
Thos. W. Riley
Herbert J. Jacobi
INVENTOR
J. B. Lambeth
BY W. J. FitzGerald
Attorneys

UNITED STATES PATENT OFFICE.

JAMES B. LAMBETH, OF LEBANON, MISSOURI.

NUT-LOCK.

936,331.   Specification of Letters Patent.   Patented Oct. 12, 1909.

Application filed September 1, 1908. Serial No. 451,178.

*To all whom it may concern:*

Be it known that I, JAMES B. LAMBETH, a citizen of the United States, residing at Lebanon, in the county of Laclede and State of Missouri, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks and has relation more particularly to that class known as side lock.

It is an object of the invention to provide a novel device of this character, wherein a movable wedge is employed for holding the nut against rotation, said wedge acting in conjunction with a washer.

It is also an object of the invention to provide a novel device of this character, wherein the wedges will be effectually held against displacement.

It is also an object of the invention to provide a novel device of this character, which will be simple in construction, efficient in practice and comparatively inexpensive to manufacture.

With the above and other objects in view, the invention consists in the details of construction and in the novel arrangement and combination of parts to be hereinafter referred to.

In the accompanying drawings which are made a part of this specification, reference will be had to the accompanying drawings, wherein like characters of reference denote corresponding parts in the several views, and in which, Figure 1 is a view in plan of one form of invention. Fig. 2 is a view in side elevation of the invention, the same being shown in applied position. Fig. 3 is a sectional view taken on line 3—3, Fig. 1. Fig. 4 is a view in perspective of the wedge member. Fig. 5 is a view similar to Fig. 1, illustrating another form of invention. Fig. 6 is a sectional view as seen on line 10—10, Fig. 5. Fig. 7 is a perspective view of the wedge employed in Fig. 1, said view being taken from a point opposite to that in Fig. 4. Fig. 8 is a view in perspective of the wedge in that form of invention disclosed in Fig. 5.

In Figs. 1 and 2, 1 denotes a bolt of any desired size, which is engaged by the nut or bur 2. Before the nut 2 is applied, there is placed on the bolt 1, the washers 3 and 4, the washer 3 being first applied. These washers are elongated and the washer 3 has one edge portion bent upwardly and inwardly, as at 5 to form an abutment for the free edge portion of a V-shaped bead 6, projecting upwardly from the washer 4, as is believed to be fully shown in Fig. 2. The corners of the washer 4 opposed to the bead 6, are bent, so as to form tongues 7 for impinging the material through which the bolt 1 passes. The inner wall 8 of the bead 6 is straight and is of such a distance from the bolt 1 as to in no way obstruct the rotation of the nut or bur 2, when it is being applied or removed.

After the bolt has been applied as desired, and in order that it may be held against rotation, a wedge 9, (Figs. 4 and 7), is inserted between the straight wall 8 and the opposed wall of the nut. This wedge may be of any desired material and is provided with an elongated recess 10, which will permit the wedge to pass not only between the straight wall 8 and the opposed wall of the nut 2, but also within the chamber formed by the V-shaped bead 6 and the washer 3. By this arrangement, the strain caused by any movement of the nut 2, is thoroughly resisted, as is believed to be apparent.

In order that the wedge may be held against accidental displacement when applied, it is provided at one end with a lug 11, which is so positioned as to spring down and over the side edges of the washers 3 and 4. In order to expedite the removal of the wedge, it is provided at its end opposite that having the lug 11 and in its upper or exposed surface, with the notch 12.

In Figs. 6 and 8 a wedge or key member 9ª is shown devoid of the lug 11 disclosed in connection with the previously described wedge or key and having a lateral notch thereon 11ª receiving a projection or offset portion 10ª of the washer 5 for the retention of the parts against displacement.

I claim:

1. A device of the character described, comprising a nut and bolt engaging washer having a lateral edge bent extension and a bifurcated or slotted locking key receiving in its slot a portion of said extension, a further portion of said extension partially over-lapping said key.

2. A device of the character described, comprising a nut and bolt engaging washer having a lateral bent extension and a bifurcated or slotted locking key receiving in its slot a portion of said extension, said key having a lateral lug at one end adapted to engage one end of said washer.

3. A device of the character described, comprising a number of nut and bolt engaging washers having laterally bent edge extensions overlapping each other and forming a socket and a bifurcated or slotted key with its slot engaging a bent portion of one of said extensions and a limb or member of said key entering said socket.

In testimony whereof I have signed my name to this specification in the presence of two subscribing witnesses.

JAMES B. LAMBETH.

Witnesses:
P. M. O'DELL,
W. I. WALLACE.